(No Model.)

W. I. GRUBB.
BALL BEARING.

No. 547,638. Patented Oct. 8, 1895.

Witnesses
Caleb J. Bieber
David Lewin

Wm. I. Grubb, Inventor

By Attorney

UNITED STATES PATENT OFFICE.

WILLIAM I. GRUBB, OF POTTSTOWN, PENNSYLVANIA.

BALL-BEARING.

SPECIFICATION forming part of Letters Patent No. 547,638, dated October 8, 1895.

Application filed November 12, 1894. Serial No. 528,493. (No model.)

*To all whom it may concern:*

Be it known that I, WILLIAM I. GRUBB, a citizen of the United States, residing at Pottstown, county of Montgomery, State of Pennsylvania, have invented certain Improvements in Ball-Bearings, of which the following is a specification.

This invention relates, particularly, to ball-bearings for velocipedes, and the main object is to provide an improved construction which will permit convenient inspection of the balls and the cleaning out of the fragments of the latter, if any are broken, without disarranging the adjustment of the bearing. The means by which I accomplish this, together with other features of the construction, are fully described in connection with the accompanying drawings, and the invention is specifically pointed out in the subjoined claims.

Figure 1:
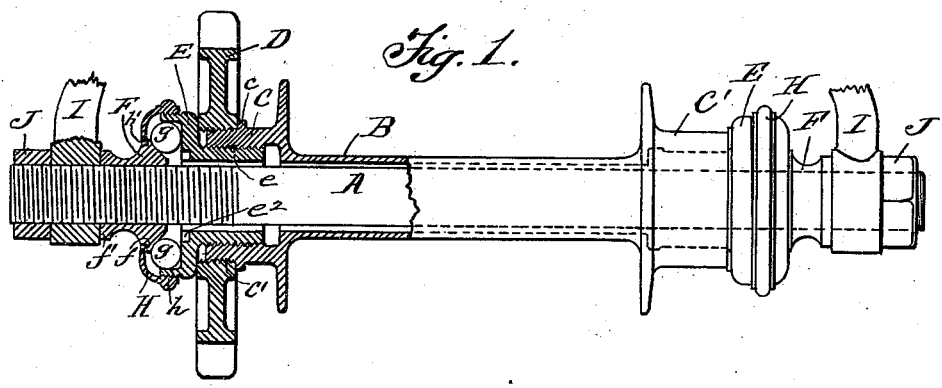
Figure 2:
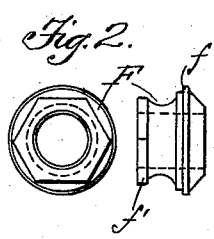
Figure 3:
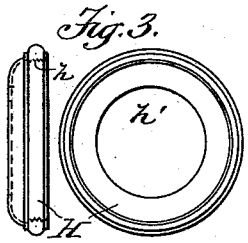
Figure 4:
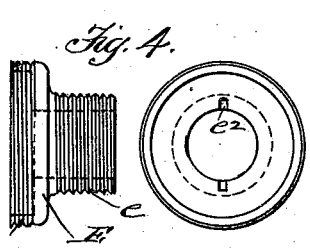

Figure 1 is an elevation, partly in section, of a bicycle-bearing embodying my invention. Figs. 2, 3, and 4 show several of the parts separately.

A represents the axle, and B the hub, of a safety-bicycle, to the frame of which the axle is fixed by means of nuts J J, which clamp the frame-legs I I firmly against the collars $f'$ on the axle. These collars, as shown, are formed integral with the cone-bearings F F, which bearings, or one of them, are adjustable horizontally on the screw-threaded ends of the axle. The hub B carries the cup-bearings E E, which are preferably formed as shown most clearly in Fig. 4, the screw-threaded shanks $e$ being arranged to loosely encircle the axle and engage the internally-screw-threaded hub ends C C', while the projecting portion is cupped to receive the balls $g$ and is also provided with interior screw driver-slots $e^2$ $e^2$ to enable the bearings to be tightly screwed into place.

The depth of the cup-bearings E, within which the balls $g$ are seated, is made but slightly greater than the radius of the balls, and a wide annular opening into the ball-chamber is formed between the circular edge of the cup-bearing and the periphery of the cone-bearing F, which opening is amply large to permit full inspection of the balls when the parts are adjusted to proper operative position, and also amply sufficient to permit the removal of the fragments of any balls which may be broken in service, or other foreign matter, without disarranging the adjustment of the parts. In order to prevent the admission of dirt to the bearing and the escape of oil therefrom through this opening, I provide a cap-piece H, which is removably secured to one of the bearings, so as to permit of its being readily moved outward independently of any other parts sufficiently to clearly expose the ball-chamber. To allow this, I make the distance between the collar $f'$ and the cone-bearing sufficient to enable the cap H to be moved far enough away from the opening which it covers before coming in contact with the frame-leg I. The central opening $h'$ of the cap H is made large enough to pass over the collar $f'$, and when the cap is secured to the cup-bearing E by screwing it upon the threaded periphery of the latter, as shown, the edge of this opening $h'$ laps over and is in close proximity to the circular flange $f$ on the cone-bearing, so as to form a substantially tight ball-chamber.

In order to conveniently fasten the sprocket-wheel D to the hub end C, I provide the latter with a collar $c$ and exterior screw-thread $c'$, upon which the sprocket-wheel is screwed against the collar, while the cup-bearing E is screwed up against it, so as to serve as a jam-nut. The screw-threads are made right or left, as usual, so as to avoid any tendency to loosen due to the operating strains.

When one of the balls $g$ breaks, which is liable to occur at any time, considerable damage is likely to be done to the bearing, and it is therefore very desirable that the construction should permit of convenient and rapid inspection of the bearing and, if required, the easy removal of the broken parts. With my improved construction this may be easily done whether the cup is used or not, it being only necessary when it is employed to expose the opening by removing the cap, thus permitting of easy access to the bearing.

It is obvious that the particular construction shown and described may be modified without departing from the spirit of my invention. I do not, therefore, desire to limit myself to the exact construction described; but

What I claim is—

1. In a ball bearing the combination with the frame forks and the hub having a cup bearing at either end thereof, of an axle provided with corresponding cone bearings arranged to form in connection with said cup bearings open ball chambers at either end of the hub, and cap pieces for closing said chambers; said frame forks being spread so as to permit independent outward movement of each of said caps sufficient to clearly expose the adjacent ball chambers substantially as and for the purpose set forth.

2. In a cycle bearing the combination with the hub and the sprocket wheel on the end thereof, of the separately formed cup bearing having a shank portion engaging the interiorly screw threaded hub and a shoulder arranged to bear against the outer face of said sprocket wheel to lock the same on the hub substantially as and for the purpose set forth.

In testimony whereof I affix my signature in presence of two witnesses.

WILLIAM I. GRUBB.

Witnesses:
W. G. STEWART,
ADAM L. OTTERBEIN.